C. W. SALADEE.
Pleasure Vehicles.
No. 134,005. Patented Dec. 17, 1872.
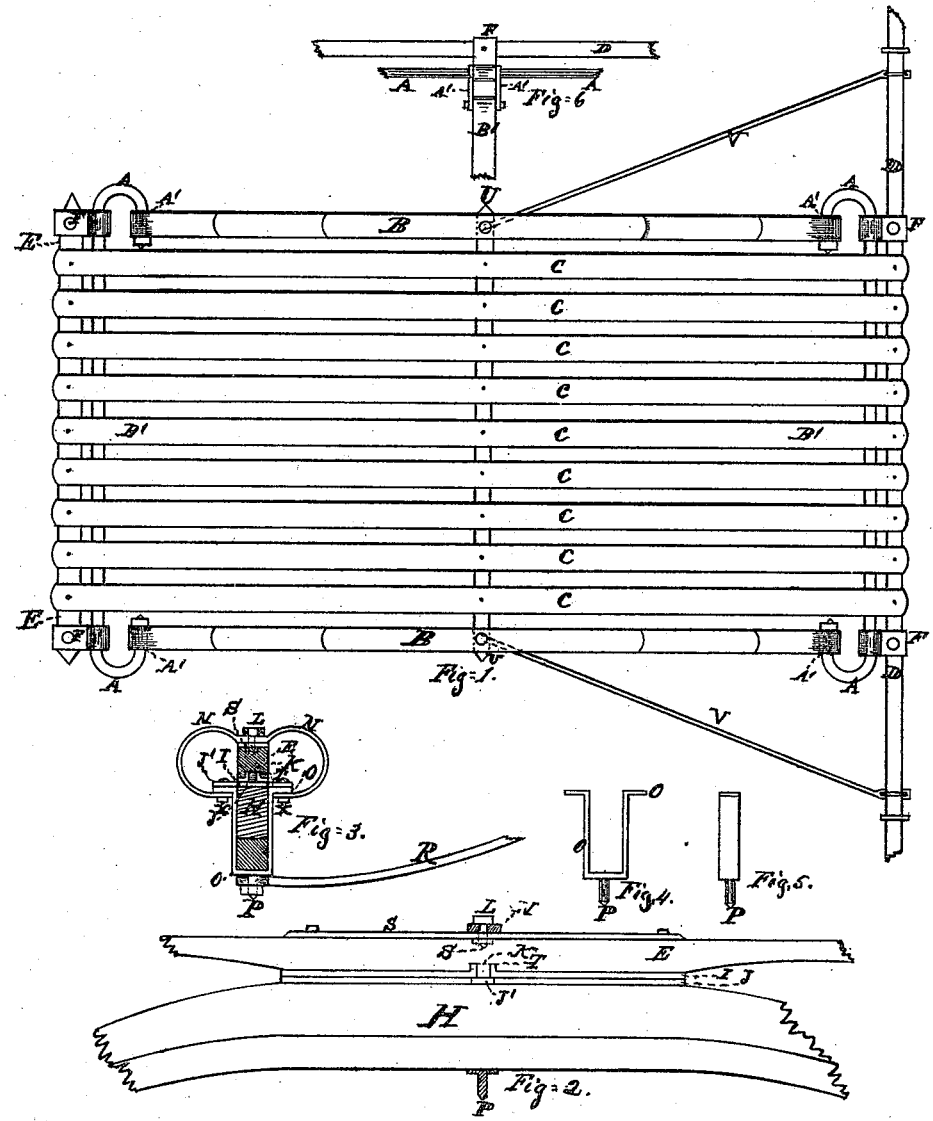
Witnesses.
Inventor.

UNITED STATES PATENT OFFICE.

CYRUS W. SALADEE, OF ST. CATHARINE'S, CANADA.

IMPROVEMENT IN PLEASURE VEHICLES.

Specification forming part of Letters Patent No. 134,005, dated December 17, 1872.

*To all whom it may concern:*

Be it known that I, CYRUS W. SALADEE, of St. Catharine's, in the Dominion of Canada, have invented certain Improvements in Road-Wagons, of which the following is a specification embodying my invention:

Nature and Object.

The first part of my invention has for its object an improvement upon that class of buggies generally known as road-wagons, and which are constructed by a peculiar and well-known combination of seat, side springs, and wooden slats with the hind axle and front bolster of the vehicle, or by a combination of seat, three-side springs, and "foot-board" with the hind axle and front bolster, and in either modification discarding the use of a body. The second part of my invention consists in an improved coupling between the bolster or head-block and front axle in running-gear to buggies, by which the ordinary king-bolt is discarded, while a great degree of safety in this connection is secured, compared with any of the present known methods of constructing axle and bolster coupling.

The Drawing.

In the drawing, Figure 1 is a top or plan view of the hind axle D, front bolster E, side springs B B, slats C, cross-bar U, and stays V. These parts combined constitute, substantially, one of the several modifications of this class of road-wagon patented and now extensively used; but the degree of side motion, as when more weight is imposed on the one side than on the other, of the springs and slats as now generally used, is a decided imperfection in this otherwise desirable vehicle. I propose to overcome this defect by adding to the combination of parts above mentioned a connecting-rod, A, secured to the rear axle and front bolster and the ends of the springs. The connecting-rod may be formed, after any of the approved methods, of links or cranks on their outer ends, and operated in bearings F and the ends of the springs B B in such manner that when one spring is depressed the opposite spring, by reason of the connecting-rod A, will be forced into a like depression. So, likewise, the wood slats C, by reason of their central connection with the springs and connecting-rods, will be equally depressed throughout the entire width of the gearing between the springs, and thus effectually prevent side motion of either springs or slats, since the whole is combined with and operated by the connecting-rods, as is clearly illustrated in this figure of the drawing.

In the other modification of road-wagon hereinbefore mentioned, where a third or central spring is substituted for the slats C, shown in Fig. 1, I form the connecting-rod A, Fig. 6, with a third link or pair of radial arms, A' A', midway between the bearings A', Fig. 1, and with a corresponding bearing, F, Fig. 6, the same as in Fig. 1, and the central or third spring will take the place of the slat B', Fig. 1, with its outer ends hinged upon the connecting-rod A, as seen in Fig. 6; and, by adding still a fourth link, A' A', as last described, a fourth spring may be hinged to the connecting-rod with equal spaces between the four springs and the rod, compelling all the springs connected thereto, be the number three, four, or more, to vibrate in unison with each other.

Fig. 2 is a front view of the central portion of the bolster E and front axle H, where is seen the axle-plate J, having a central stud, K, formed solid upon its top surface, over which is fitted the bolster-plate I, which has a hole through its center corresponding with the stud K on the axle-plate. For the purpose of giving greater bearing to the stud K, the bolster-plate I has an enlarged boss, T, formed upon its top surface, through which and the plate the hole is pierced to receive the stud K of the lower plate, and which takes the place of the ordinary king-bolt. Fig. 3 is an end view of the axle and bolster in section, and showing the ends of the plates last described and their mode of connection. Next in order is the clip O, Fig. 3, upon the bottom of which is formed solid, and as part of the same, the short connecting-bolt P, to receive the brace R, which extends from the bottom of the axle to the under side of the gearing in the usual way. The upper ends of this clip O terminate in forming an L-bearing closely fitting under the right-angle central projections J' of the axle-plate J. Next in order is the stirrup N passing over the top of the bolster E, and terminating under the L-bearings of the clip O, or on top of the projection J' of plate J, and there securely held by a passing bolt, X. The top central portion of this stirrup M is firmly held down upon the bolster by means of the screw-bolt L, which finds its thread in the upper bolster-plate S, and by this means the bolster and front axle are held together upon the coupling described, yet allowing free action in turning the vehicle, and without a hole through either the axle or bolster; and in case the coupling-connection K T is broken, the stirrup N will prevent the bolster E from falling to the ground.

Another mode of connecting the central portion of the stirrup N to the bolster-plate S is to discard the screw-bolt L, and in its stead form a stud on the top surface of the bolster-plate, and the same made to pass up through the bolt-hole now filled by the screw-bolt L; and a nut may or may not be applied to take the place of the head of the bolt L and answer the same purpose; or a stud, equal in length and thickness to the passing bolt L, may be formed solid upon the under side of the stirrup N, and the same pass down through the bolt-hole in plate S, leaving the top surface of the stirrup perfectly smooth, and which I consider the best of the several modifications hereinbefore described for this connection.

Claims.

I claim—

1. In combination with the springs B B, slats C, bolster E, and hind axle D, the two separate connecting-rods, A A and A A, as and for the purpose set forth.

2. The connecting-rod A A having the ordinary links or bearings upon both ends, and provided with any desired number of intermediate links A′, Fig. 6, wherein to secure and operate a corresponding number of intermediate springs, as and for the purpose set forth.

3. The axle-clip O, Figs. 3, 4, and 5, when provided with the connecting-bolt P, and the same in combination with the under brace R and axle-plate J J′, as and for the purpose set forth.

4. The stirrup N and bolt or stud L, in combination with the bolster E and axle-plate J J′, as and for the purpose set forth.

5. The combination of the several parts N, E, K, T, I, J, and H, constructed, arranged, and operating as and for the purpose shown and described.

CYRUS W. SALADEE.

Witnesses:
H. RICHARD DAVIS,
JAMES McBRIDE.